United States Patent [19]
Hattori et al.

[11] Patent Number: 5,212,560
[45] Date of Patent: May 18, 1993

[54] ELECTROPHOTOGRAPHIC IMAGE FORMING APPARATUS COMPRISING MEANS FOR AUTOMATICALLY ADJUSTING IMAGE REPRODUCTION DENSITY

[75] Inventors: Yoshihiro Hattori, Tokokawa; Kazuyuki Fukui, Toyohashi; Takanobu Yamada, Toyokawa; Yoshikazu Naito, Gamagori, all of Japan

[73] Assignee: Minolta Camera Kabushiki Kaisha, Osaka, Japan

[21] Appl. No.: 799,178

[22] Filed: Nov. 27, 1991

[30] Foreign Application Priority Data
Nov. 30, 1990 [JP] Japan .................. 2-337551

[51] Int. Cl.$^5$ .................. G03G 15/00; B41J 3/00; H04N 1/23
[52] U.S. Cl. .................. 358/360; 358/80; 346/160; 355/208
[58] Field of Search .......... 346/157, 160; 358/300, 358/75, 80; 355/208

[56] References Cited
U.S. PATENT DOCUMENTS

| | | | |
|---|---|---|---|
| 4,226,525 | 10/1980 | Sakamoto et al. | 355/214 |
| 4,277,162 | 7/1981 | Kasahara et al. | 355/208 |
| 4,855,766 | 8/1989 | Suzuki | 346/160 |
| 4,873,428 | 10/1989 | Takeuchi et al. | 250/214 D C |
| 4,879,577 | 11/1989 | Mabroak et al. | 355/208 |
| 5,153,609 | 10/1992 | Ando et al. | 355/208 X |

FOREIGN PATENT DOCUMENTS
1-196347 8/1989 Japan .

*Primary Examiner*—Joan H. Pendegrass
*Attorney, Agent, or Firm*—Burns, Doane, Swecker & Mathis

[57] ABSTRACT

In an electrophotographic image forming apparatus, a corona charger electrically charges the photoconductor to a predetermined initial electric potential so as to supply an amount of electric charge thereto, and a laser projects a light onto the charged photoconductor so as to form an electrostatic latent image thereon. A light projecting controller controls the laser to change a light amount of the projected light according to an image density signal, and a developing device develops the formed electrostatic latent image with toner so as to form a toner image thereon. Then, a voltage generator applies a developing bias voltage to the developing device. Moreover, a density controller controls the corona charger and the voltage generator to change the amount of supplied electric charge and the developing bias voltage, and further controls the voltage generator so that a difference between the initial electric potential and the developing bias voltage becomes larger and a minimum light amount of first starting reproducing an image becomes smaller as the amount of supplied electric potential becomes larger.

16 Claims, 13 Drawing Sheets

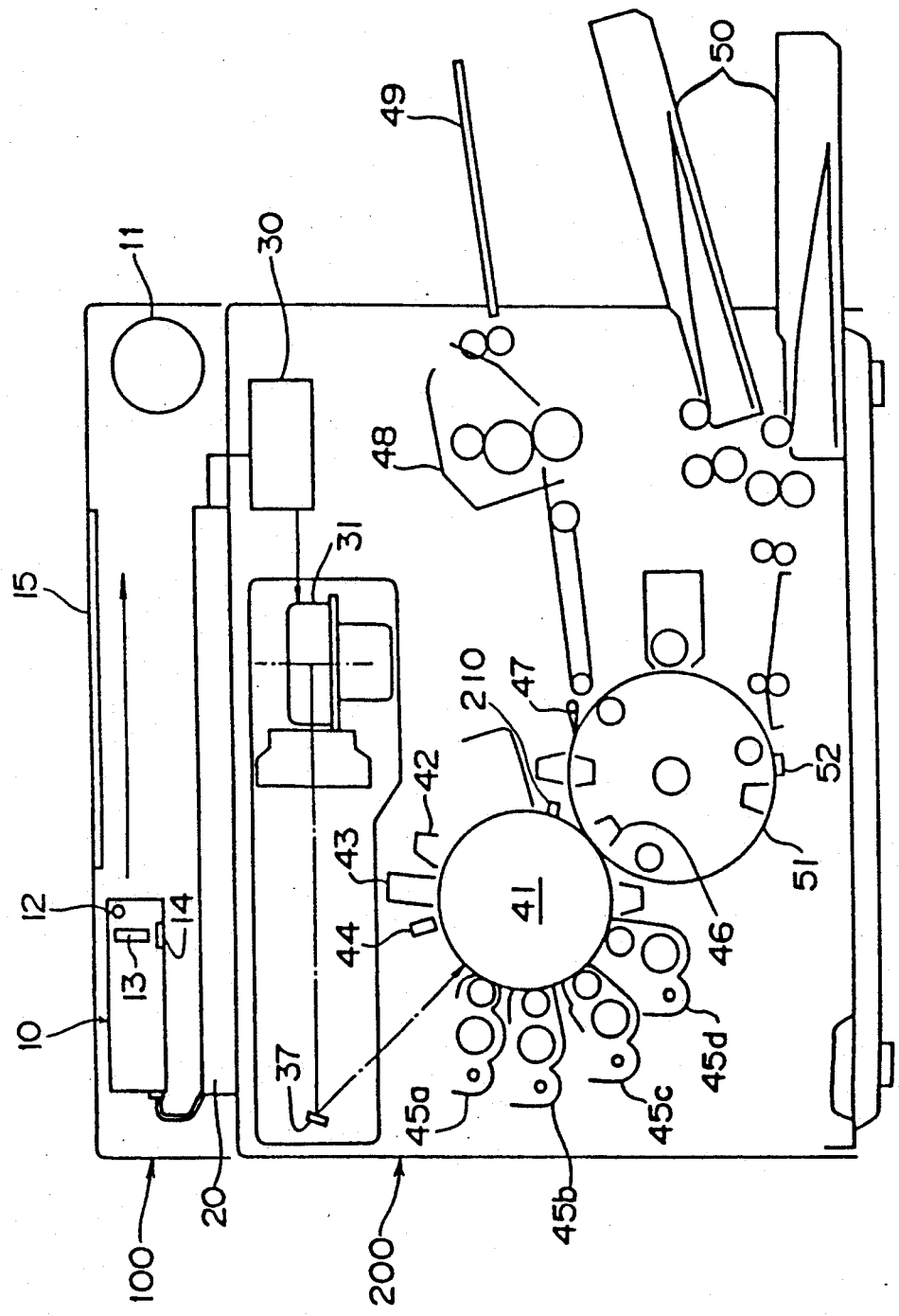

ELECTROPHOTOGRAPHIC IMAGE FORMING APPARATUS COMPRISING MEANS FOR AUTOMATICALLY ADJUSTING IMAGE REPRODUCTION DENSITY

BACKGROUND OF THE INVENTION

1. Field of the Invention

The present invention relates to an electrophotographic image forming apparatus, and more particularly, to an electrophotographic image forming apparatus, such as an electrophotographic copying apparatus, an electrophotographic printer, comprising means for automatically adjusting an image reproduction density so as to always obtain a stable gradation reproducibility.

2. Description of the Related Art

Conventionally, there have been put into practical use various kinds of electrophotographic digital image forming apparatuses such as a laser printer, each using an electrophotographic process of reversal development type for driving a laser diode based on digital image data of an image of an original and reproducing the image of the original on a sheet of printing paper. Further, there have been proposed various kinds of digital image forming methods for faithfully reproducing a half-tone image such as a photograph.

As the digital image forming methods of these type, there have been known to those skilled in the art, an area gradation method using a dither matrix, and multi-value laser exposure methods such as a pulse width modulation method for representing a gradation of one dot image to be printed by changing a pulse width or an emitting time of a beam of laser light so as to change a light amount thereof defined as a product of the emitting time and an emitting intensity, and an intensity modulation method for representing a gradation of one dot image to be printed by changing an emitting intensity of a beam of laser light so as to change a light amount thereof (See Japanese Patent Laid-open Publication Nos. 62-91077, 62-39972, 62-188562 and 61-22597). Further, there has been publicly known a multi-value dither method which is a combination of the dither method and the above-mentioned pulse width modulation method or the above-mentioned intensity modulation method.

In the gradation method of this type for representing a gradation, it is considered possible in principle to reproduce an image density having a gradation strictly corresponding to a gradation of image data to be reproduced, however, an actually reproduced image density (referred to as an image reproduction density hereinafter) is not correctly proportional to an original density to be reproduced because of a complicated combination of characteristics of a photoconductor and toners and circumstances etc. In other words, a relationship between the image reproduction density and the original density is shifted from a linear characteristic curve to be originally obtained. Such shifted characteristic as described above is generally called a γ characteristic, which mainly causes deterioration of faithfulness of reproduced images of originals, particularly a half-tone original.

Therefore, in order to improve faithfulness of a reproduced image, conventionally, there has been performed a so-called γ correction process for converting data of a read original density into data using a predetermined γ correction table and forming a digital image of dot images based on the converted data of the original density so that the relationship between the original density and the image reproduction density becomes linear. Thus, normally, the image of the original can be faithfully reproduced depending on the original density by performing the above-mentioned the γ correction process.

On the other hand, as one of phenomena due to another cause for influencing the image reproduction density, there is known such a phenomenon that an adhering toner amount onto the photoconductor changes upon a developing process using the toner when characteristics of the photoconductor and the toner change due to change in external circumstances such as the temperature, the humidity, etc. Generally speaking, the adhering toner amount increases under circumstances of a high temperature and a high humidity so that the original image having a higher image reproduction density is reproduced with a γ characteristic having a relatively large gradient in a relatively high original density. On the other hand, the adhering toner amount decreases under circumstances of a low temperature and a low humidity so that the original image having a lower image reproduction density is reproduced with a γ characteristic having a relatively small gradient in relatively low and middle original densities.

Thus, there is such a problem that the reproduced image density changes due to change in the circumstances. In order to solve the above-mentioned problem so as to obtain a stable proper image reproduction density, there has been performed an image density control process for controlling the maximum image reproduction density to be constant, generally, in a conventional electrophotographic copying apparatus, a conventional electrophotographic printer, or the like.

One of the above-mentioned image density control processes which have been put into practical use will be described below with reference to FIG. 5 for illustrating an image forming part comprising a photoconductive drum 41 and a developing roller 45r.

Referring to FIG. 5, a corona charger 43 having a discharging electric potential $V_C$ is provided so as to confront a photoconductive drum 41. A negative grid voltage $V_G$ is applied to a grid of the corona charger 43 by a grid voltage $V_G$ generator 243. Since it is considered that a surface electric potential Vo on the surface of the photoconductive drum 41 immediately after electrically charging the photoconductive drum 41 by the corona charger 43 and prior to an exposure of a beam of laser light is approximately equal to the grid voltage $V_G$, the surface electric potential Vo on the photoconductive drum 41 can be controlled by changing the grid voltage $V_G$. Further, the surface electric potential Vo immediately after electrically charging it and prior to the exposure of a beam of laser light is detected by a Vo sensor 44 of a surface electrometer. It is to be noted that the surface electric potential on the photoconductive drum 41 becomes the above-mentioned surface electric potential Vo, when an exposure level EXL of a beam of laser light (referred to as an exposure level hereinafter) is a minimum value thereof (zero in the present preferred embodiment) even after the exposure of a beam of laser light.

In the first place, prior to the exposure of a beam of laser light, a negative surface electric potential Vo is set on the photoconductive drum 41 by the corona charger 43 thereby supplying an amount of electric charge corresponding to the surface electric potential $V_O$ thereto, and then, a negative developing bias voltage $V_B$ ($|V_O| > |V_B|$) of a relatively low electric potential is applied to the developing roller 45r by a developing bias voltage $V_B$ generator 244. In this case, the surface electric potential of a developing sleeve of the developing device 45r is also set to the developing bias voltage $V_B$.

Upon the exposure of a beam of light, an electric potential at an exposed position on the photoconductive drum 41 is lowered so as to change from the surface electric potential $V_O$ to an attenuated electric potential of an electrostatic latent image or a surface electric potential $V_I$ after the exposure of a beam of laser light. The surface electric potential $V_I$ upon a maximum exposure level EXL is referred to as a surface electric potential $V_{Im}$ hereinafter.

When the attenuated surface electric potential $V_I$ becomes lower than the developing bias voltage $V_B$, the toner transported onto the surface of the developing sleeve of the developing device 45r adheres onto the surface of the photoconductive drum 41. In this case, it is necessary to fall a difference between the surface electric potential $V_O$ and the developing bias voltage $V_B$ into a predetermined range, and also the adhering toner amount becomes larger as a developing voltage $\Delta V = |V_B - V_I|$ becomes higher. On the other hand, the attenuated surface electric potential $V_I$ changes depending on the surface electric potential $V_O$ even upon the same exposure level Accordingly, for example, when the surface electric potential $V_O$ and the developing bias voltage $V_B$ are changed making a difference between the surface electric potential $V_O$ and the developing bias voltage $V_B$ constant, a difference between the developing bias voltage $V_B$ and the surface electric potential $V_I$ changes, and then, the adhering toner amount changes, thereby controlling an image reproduction density of a reproduced image.

According to the image density control process of this type as described above, the maximum image reproduction density is made constant by automatically or manually by an operator's changing the surface electric potential $V_O$ on the photoconductive drum 41 and/or the developing bias voltage $V_B$.

In the automatic image density control process, first of all, a reference toner image of a reference image pattern which becomes a reference for the image density control process is formed on the surface of the photoconductive drum 41, and a light amount of a reflected light from the reference toner image is detected by an automatic image density control sensor (referred to as an AIDC sensor hereinafter) 210 provided in the vicinity of the photoconductive drum 41, thereby measuring an image reproduction density of the reference toner image. Data of the detection value detected by the AIDC sensor 203 are inputted to a printer controller 201, which in turn controls the grid voltage $V_G$ generator 243 and the developing bias voltage $V_B$ generator 244 in accordance with a comparison result between the data of the detection value detected by the AIDC sensor 203 and a predetermined value. The above-mentioned process is repeated until the adhering toner amount becomes the predetermined value.

In this case, in order to prevent any fog from being formed on a background of an image and to prevent carrier included in a developer including two components from adhering onto the photoconductor of the photoconductive drum 41, the image density control process is performed making a difference between the surface electric potential $V_O$ and the developing bias voltage $V_B$ constant, conventionally.

As described above, however, when the image density control process is performed by changing the surface electric potential $V_O$ and the developing bias voltage $V_B$ making the difference between the surface electric potential $V_O$ and the developing bias voltage $V_B$ constant, the above-mentioned $\gamma$ characteristic is greatly influenced, and then, there is such a problem that there can be always obtained a reproduced image having a stably gradation reproducibility for an original since the $\gamma$ characteristic itself greatly changes when there is performed the image density control process by changing the surface electric potential $V_O$ and the developing bias voltage $V_B$ depending on change in the circumstances.

SUMMARY OF THE INVENTION

An object of the present invention is therefore to provide an electrophotographic image forming apparatus capable of always reproducing an image having a stable gradation reproducibility for an original by correcting change in a $\gamma$ characteristic due to a result of the above-mentioned image density control process.

Another object of the present invention is to provided an electrophotographic image forming apparatus capable of preventing not only carrier included the developer from adhering onto a photoconductor which may be caused in the case of a relatively high grid voltage $V_G$ but also any fog which may be caused in the case of a relatively low grid voltage $V_G$.

In order to achieve the aforementioned objective, according to one aspect of the present invention, there is provided an electrophotographic image forming apparatus comprising:

a photoconductor;

charger means for electrically charging said photoconductor to a predetermined initial electric potential so as to supply an amount of electric charge corresponding to the predetermined initial electric potential thereto;

light projecting means for projecting a light onto said photoconductor electrically charged to the predetermined initial electric potential so as to form an electrostatic latent image on said photoconductor;

light projecting control means for controlling said light projecting means to change a light amount of the light projected onto said photoconductor by said light projecting means according to an image density signal for representing densities of respective pixels of an image to be formed;

developing means for developing the electrostatic latent image formed on said photoconductor with toner so as to form a toner image on said photoconductor;

voltage applying means for applying a developing bias voltage to said developing means; and density control means for controlling said charger means and said voltage applying means to change the amount of electric charge supplied from said charger means to said photoconductor and the developing bias voltage, said density control means controlling said voltage applying means so that a difference between the predetermined initial electric potential and the developing bias voltage becomes larger and a light amount of first starting reproducing an image which is a minimum light amount from said light projecting means when the toner image is formed on said photoconductor becomes smaller as the amount of electric potential supplied to said photoconductor becomes larger.

According to another aspect of the present invention, there is provided an electrophotographic image forming apparatus comprising:

a photoconductor;

charger means for electrically charging said photoconductor to a predetermined initial electric potential;

light projecting means for projecting a light onto said photoconductor electrically charged to the predetermined initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means; and density control means for controlling said charger means and said voltage applying means to change the initial electric potential and the developing bias voltage, said density control means controlling said charger means and said voltage applying means so that a difference between the initial electric potential and the developing bias voltage becomes larger and a value of the following ratio becomes larger as the absolute value of the initial electric potential becomes larger:

$$(V_B - V_{Im})/(V_o - V_{Im}),$$

where $V_B$ is the developing bias voltage, $V_o$ is the initial electric potential, and $V_{Im}$ is an electric potential on the surface of said photoconductor in the case of a maximum light amount of the light projected from said light projecting means onto said photoconductor.

According to a further aspect of the present invention, there is provided an electrophotographic image forming apparatus comprising:

a photoconductor;

charger means for electrically charging said photoconductor to a predetermined initial electric potential;

light projecting means for projecting a light onto said photoconductor electrically charged to the predetermined initial electric potential so as to form an electrostatic latent image on said photoconductor;

developing means for developing the electrostatic latent image formed on said photoconductor with toner so as to form a toner image on said photoconductor;

voltage applying means for applying a developing bias voltage to said developing means;

detection means for detecting a state of said photoconductor;

storage means for storing a plurality of gradation correction data for correcting a gradation of an image to be formed;

selecting means for selecting one of the plurality of gradation correction data stored by said storage means based on the developing bias voltage and the initial electric potential;

correcting means for correcting an image density signal for representing densities of respective pixels of the image to be formed based on the gradation correction data selected by said selecting means;

light projecting control means for controlling a light amount of the light projected from said light projecting means onto said photoconductor according to the image density signal corrected by said correcting means; and density control means for controlling said charger means and said voltage applying means to change the initial electric potential and the developing bias voltage based on a detection result of said detection means, said density control means controlling said charger means and said voltage applying means so that a difference between the initial electric potential and the developing bias voltage becomes larger and a value of the following ratio becomes larger as the absolute value of the initial electric potential becomes larger:

$$(V_B - V_{Im})/(V_o - V_{Im}),$$

where $V_B$ is the developing bias voltage, $V_o$ is the initial electric potential, and $V_{Im}$ is an electric potential on the surface of said photoconductor in the case of a maximum light amount of the light projected from said light projecting means onto said photoconductor.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIG. 1 is a longitudinal cross sectional view showing the whole structure of a digital color copying apparatus according to a preferred embodiment of the present invention;

FIG. 3 is a block diagram of an image signal processor shown in FIG. 2a;

DETAILED DESCRIPTION OF THE PREFERRED EMBODIMENT

Figure 2A:
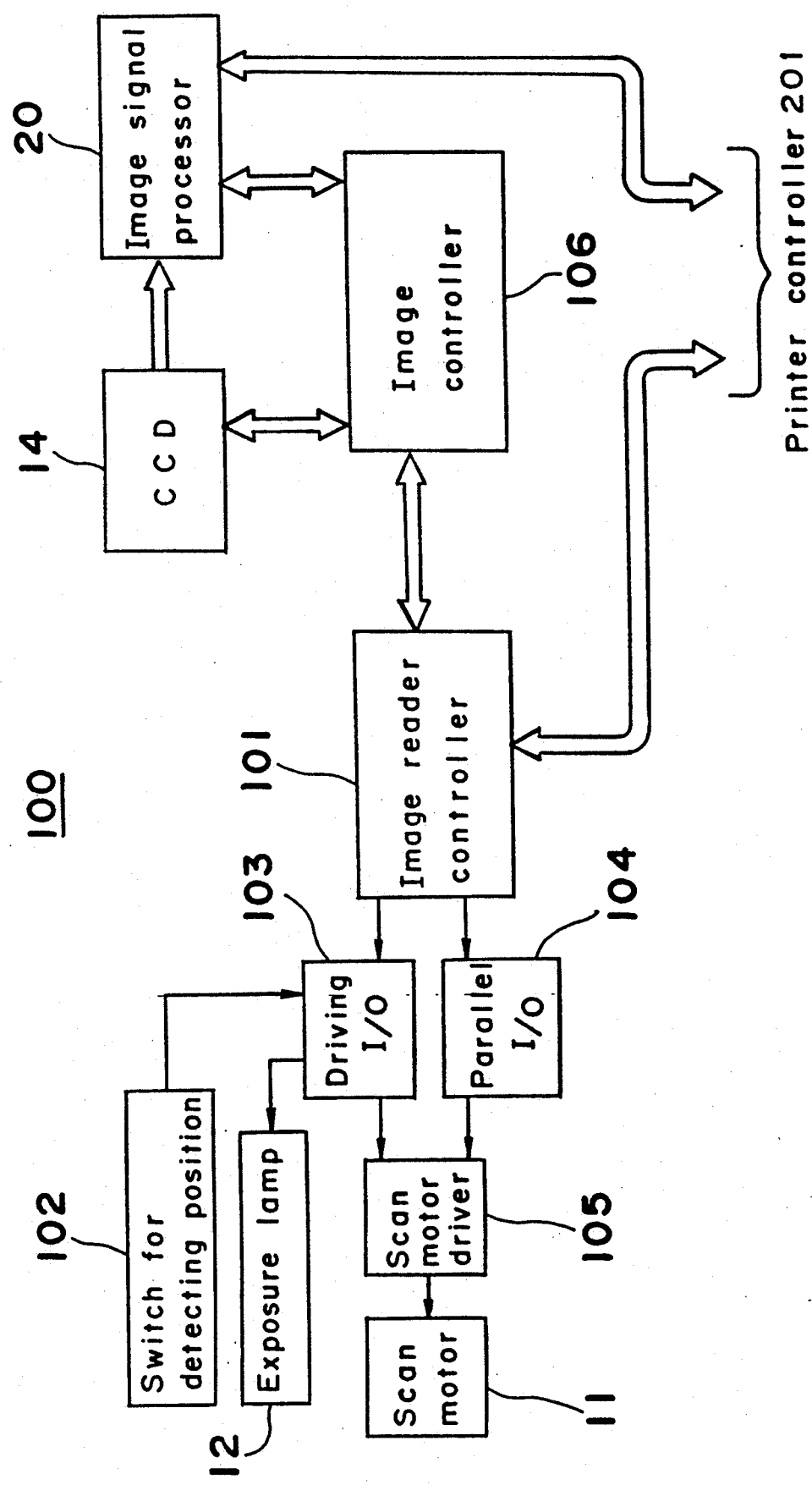
FIGS. 2a and 2b are block diagrams of a controlling part of the digital full color copying apparatus shown in FIG. 1.

A digital full color copying apparatus according to a preferred embodiment of the present invention will be described hereinbelow with reference to the accompanying drawings. The description thereof will be made in an order of the following items;

(a) Structure of Digital full color copying apparatus (b) Processing of Image signal (c) Automatic density control and Gradation correction in Electrophotographic process of reversal development type (d) Controlling flow of printing process In the digital full color copying apparatus according to the present preferred embodiment of the present invention using an electrophotographic process of reversal development type for printing an image using an intensity modulation method, when an image reproduction density is adjusted by changing a grid voltage $V_G$ of a corona charger 43 and a developing bias voltage $V_B$ of each of developing devices 45a to 45d based on the adhering toner amount measured by the AIDC sensor 210, the developing bias voltage $V_B$ is set so that an absolute value $|V_O - V_B|$ of a difference between the surface electric potential $V_O$ and the developing bias voltage $V_B$ becomes larger and a reproduction start light amount becomes smaller as the grid voltage $V_G$ or the surface voltage $V_O$ becomes larger. The reproduction start light amount is a light amount of a beam of laser light when first starting reproducing an image as the light amount changes from zero.

(a) Structure of digital full color copying apparatus

FIG. 1 shows the whole structure of the digital full color copying apparatus according to the present preferred embodiment. The digital full color copying apparatus is mainly divided into an image reader part 100 for reading an image of an original (referred to as an original image hereinafter) and a copying part 200 for reproducing the original image read by the image reader part 100.

A scanner 10 of the image reader part 100 comprises an exposure lamp 12 for illuminating an original placed on a platen 15, a rod lens array 13 for condensing a reflected light from the original, and a contact type CCD color image sensor 14 for converting the condensed reflected light into electric image signals. Upon reading an original image, the scanner 10 is driven by a motor 11 so as to move in a subscan direction as indicated by an arrow, thereby scanning the original image placed on the platen 15. The reflected light from original image illuminated by the exposure lamp 12 is photoelectrically converted into multi-value electric image signals of three colors of red (R), green (G) and blue (B) by the image sensor 14. The multi-value electric image signals of three colors outputted from the image sensor 14 are converted by a read image signal processor 20 into eight bit gradation data of either one of yellow (Y), magenta (M), cyan (C), and black (K). Thereafter, the eight bit gradation data are stored in a buffer memory 30 for synchronization.

Figure 4:
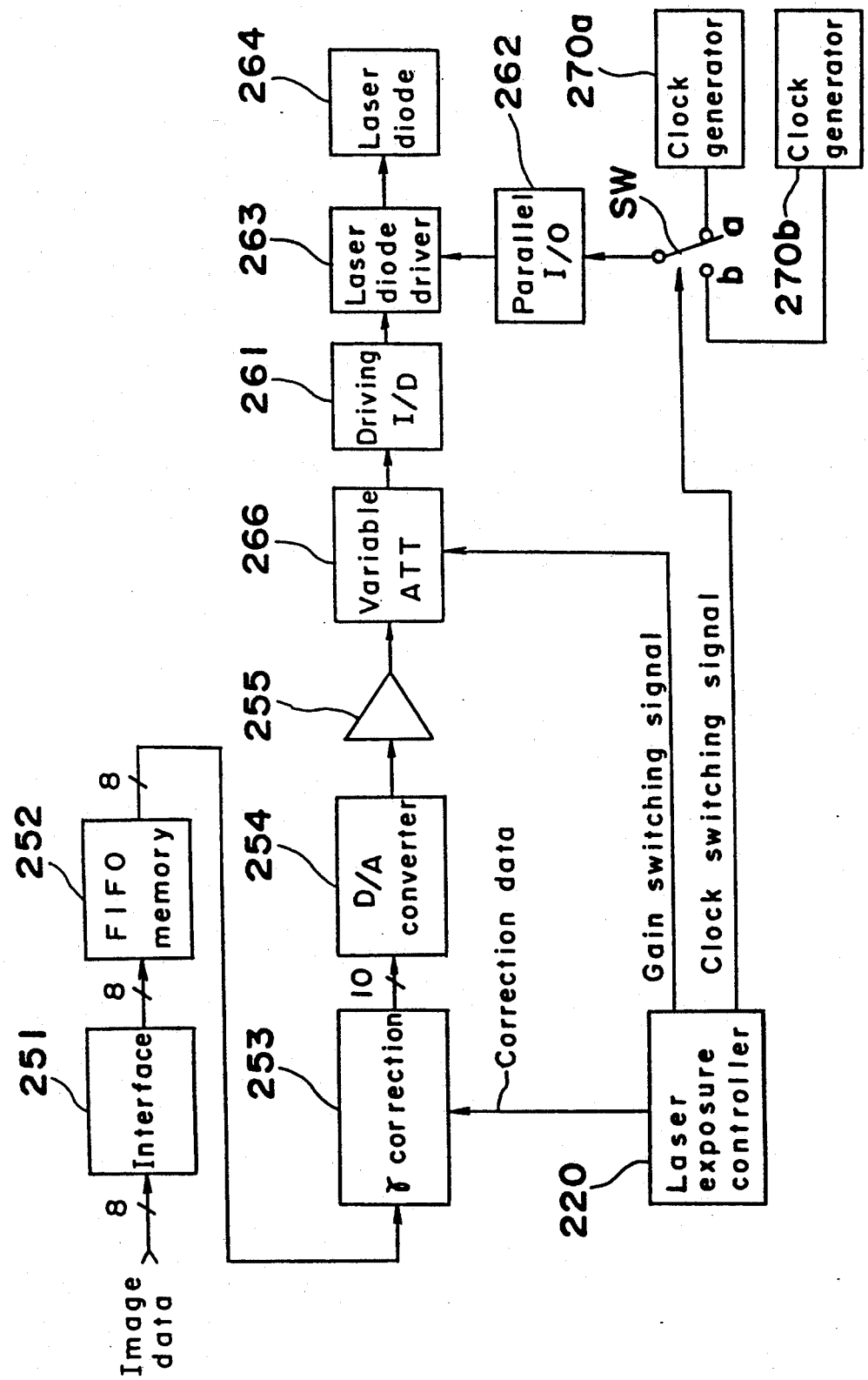
FIG. 4 is a block diagram of an image data processing part of a printer controller shown in FIG. 2b.

Subsequently, in the copying part 200, a print head part 31 carries out a gradation correction process or a γ correction depending on a gradation characteristic of the photoconductive drum 41 for the inputted gradation data, and then, converts the corrected image data into an analogue laser diode driving signal. A semiconductor laser diode 264 shown in FIG. 4 is driven according to the laser diode driving signal.

A beam of laser light emitted from the semiconductor laser diode 264 of the print head part 31 according to the laser diode driving signal is projected through a reflection mirror 37 onto the photoconductive drum 41 rotated. The photoconductive drum 41 is illuminated by an eraser lamp 42 before the exposure of a beam of laser light every copying process, and also is electrically charged uniformly by the corona charger 43. When the photoconductive drum 41 is exposed to a beam of laser light in this state, an electrostatic latent image corresponding to the original image is formed thereon. Only one of the developing devices 45a to 45d respectively including cyan, magenta, yellow and black toners is selected, and the electrostatic latent image formed on the photoconductive drum 41 is developed with toner by the selected one developing device so as to form a toner image thereon. The developed toner image is transferred by a transfer charger 46 onto a sheet of copying paper wound around a transfer drum 51. On the other hand, an adhering toner amount of a reference toner image which is developed after an exposure of a predetermined light amount of a beam of light onto a predetermined area on the photoconductive drum 41 is optically detected by the AIDC sensor 210. In other words, the reference toner image is illuminated so that an illumination light is obliquely incident thereonto, and a reflected light from the reference toner image is detected by the AIDC sensor 210. The above-mentioned adhering toner amount is measured based on the intensity of the reflected light from the reference toner image.

The above-mentioned printing process is repeatedly performed for images of respective colors of yellow (Y), magenta (M), cyan (C) and black (K). At that time, the scanner 10 repeatedly performs the scan operation in synchronization with the rotation of the photoconductive drum 41 and the transfer drum 51. Thereafter, the copying paper is separated from the transfer drum 51 by a separating nail 47, and then, the toner image transferred on the copying paper is fixed by a fixing device 48. Thereafter, the copying paper is discharged onto a paper discharge tray 49. A sheet of copying paper is fed from a paper cassette 50, the end of which is chucked by a chucking mechanism 52 provided on the transfer drum 51, thereby preventing any positional displacement of the copying paper during the transfer process.

Figure 2B:
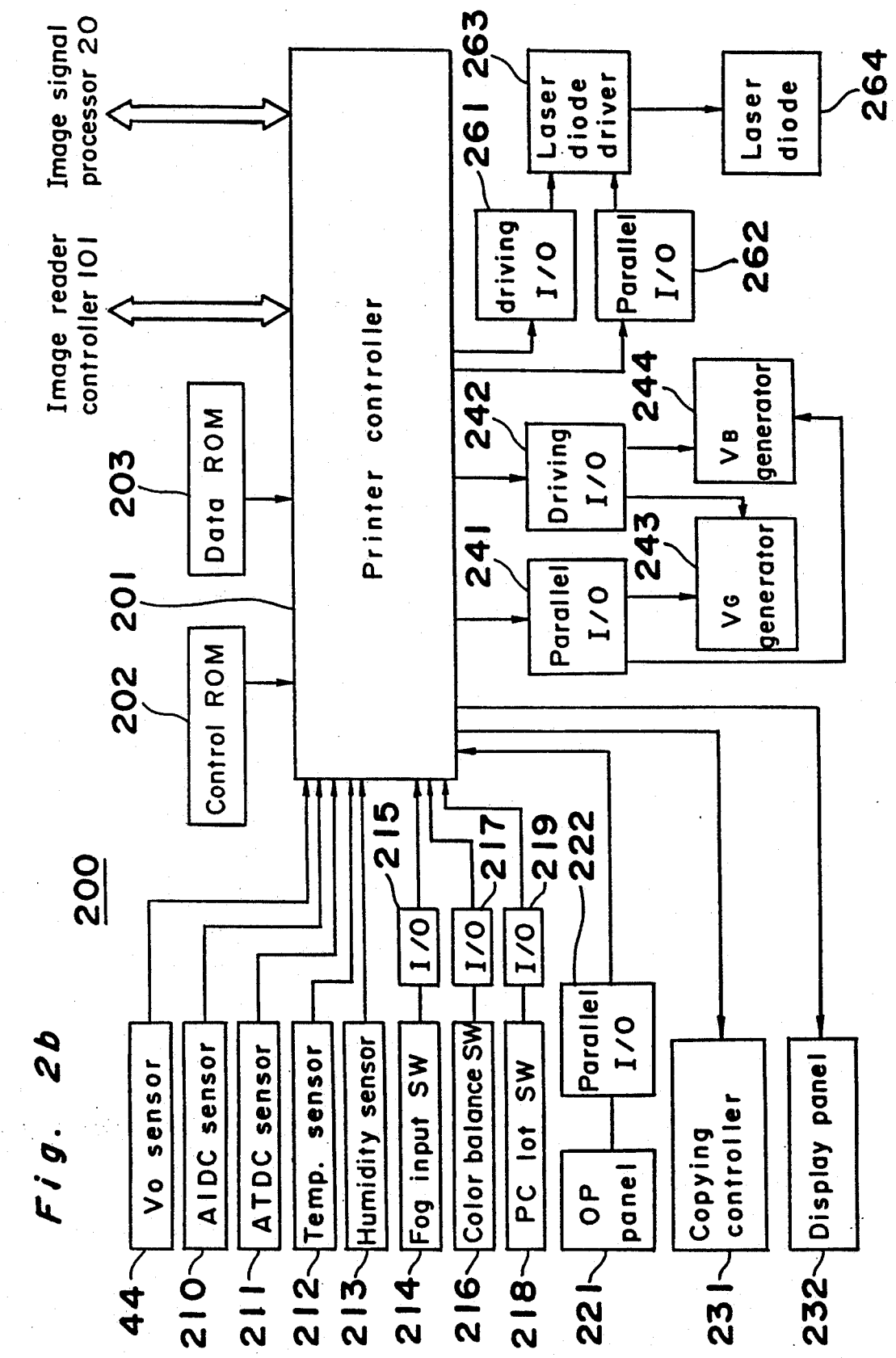

FIGS. 2a and 2b are block diagrams of a controlling part of the digital full color copying apparatus shown in FIG. 1.

Referring to FIG. 2a, the image reader part 100 is controlled by an image reader controller 101. The image reader controller 101 controls the exposure lamp 12 through a driving input and output device (referred to as a driving I/O hereinafter) 103 in accordance with a positional signal outputted from a position detecting switch 102 which detects a position of the original on the platen 15. Moreover, the image reader controller 101 controls a scan motor driver 105 through the driving I/O 103 and a parallel input and output interface circuit (referred to as a parallel I/O hereinafter) 104. A scan motor 11 is rotated by the scan motor driver 105.

On the other hand, the image reader controller 101 is electrically connected to an image controller 106 through a bus. The image controller 106 is electrically connected to not only the CCD color image sensor 14 but also the image signal processor 20 through respective buses. The electric image signals outputted from the CCD color image sensor 14 are inputted to the image signal processor 20 to be processed therein.

Referring to FIG. 2b, the copying part 200 comprises a printer controller 201 for controlling a general copying operation.

The printer controller 201 having a CPU is electrically connected to not only a control ROM 202 for storing a control program but also a data ROM 203 for storing various kinds of data including γ correction data, γ correction tables etc. The printer controller 201 controls the printing operation in accordance with the data stored in these ROMs 202 and 203.

Figure 5:
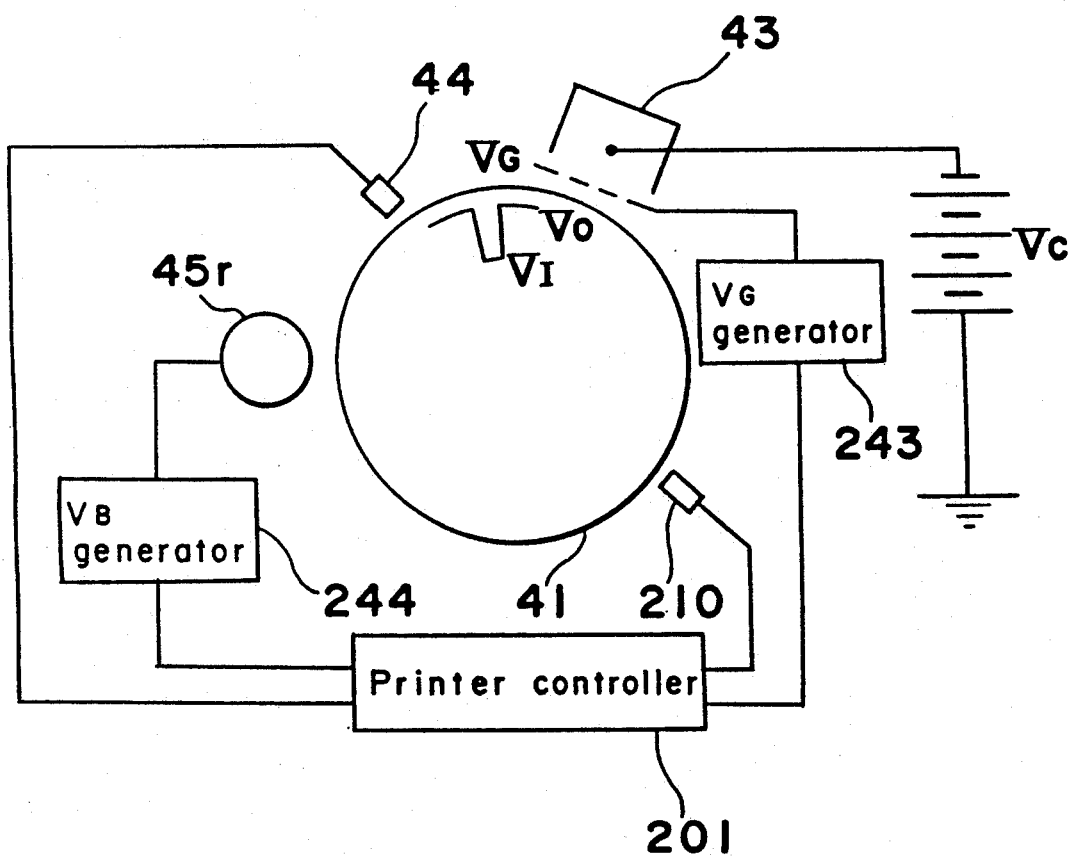
FIG. 5 is a schematic block diagram of devices provided around a photoconductive drum of a conventional copying apparatus.

Analogue signals outputted from the Vo sensor 44 for detecting a surface potential Vo on the photoconductive drum 41, the AIDC sensor 210 for optically detecting the adhering toner amount of the reference toner image adhering onto the surface of the photoconductive drum 41, an ATDC sensor 211 for detecting toner densities of toners of respective colors provided within the respective developing devices 45a to 45d, a temperature sensor 212 and a humidity sensor 213 are inputted to the printer controller 201. The AIDC sensor 210 is provided at such a position between a transfer position and the eraser lamp 42 as shown in FIGS. 1 and 5.

There are provided a two bit fog input switch 214 for setting a fog removal level in four stapes which is a setting level for removing a fog, four bit color balance switches 216 for setting color balances of the respective colors, and a three bit photoconductor lot switch 218 for correcting a lot dependency of the characteristics of the photoconductive drum 41. The switches 214, 216 and 218 are electrically connected to the printer controller 201, respectively, through input and output interface circuits (referred to as I/O interfaces hereinafter) 215, 217 and 219.

In the present preferred embodiment, the fog removal level of two bits is set in four steps using the fog input switch 214 of a DIP switch by a maintenance man or an operator of a user. However, it may be possible to input the fog removal level using an operation panel 221 through a parallel I/O 222. Moreover, various kinds of data are inputted to the printer controller 201 by manipulation of keys provided on the operation panel 221 through the parallel I/O 222.

The printer controller 201 controls a copying controller 231 and a display panel 232 according to contents of the control program stored in the control ROM 202 based on the data outputted from the sensors 44 and 210 to 213, the operation panel 221, the respective input switches 214, 216 and 218, and the data ROM 203. Moreover, the printer controller 201 controls not only the grid voltage $V_G$ generator 243 for generating a grid voltage $V_G$ of the corona charger 43 but also the developing bias voltage $V_B$ generator 244 for generating a developing bias voltage $V_B$ of each of the developing devices 45a to 45d through a parallel I/O 241 and a driving I/O 242, respectively, in order to perform an automatic image density control process using the AIDC sensor 210 or a manual image density control process by inputting setting data such as the grid voltage $V_G$ and the developing bias voltage $V_B$ using the operation panel 221.

The printer controller 201 is further electrically connected to the image signal processor 20 of the image reader part 100 through an image data bus, and then, the printer controller 201 controls a semiconductor laser driver 263 through a driving I/O 261 and a parallel I/O 262 with referring to the contents of data stored in the data ROM 203 for storing the $\gamma$ correction table on the basis of an image density signal inputted thereto through the image data bus. The semiconductor laser diode 264 is driven by the semiconductor laser driver 263 so as to emit a beam of laser light. The gradation of an image is represented by modulating an emitting intensity of a beam of laser light emitted from the semiconductor laser diode 264.

(b) Processing of image signal

Figure 3:
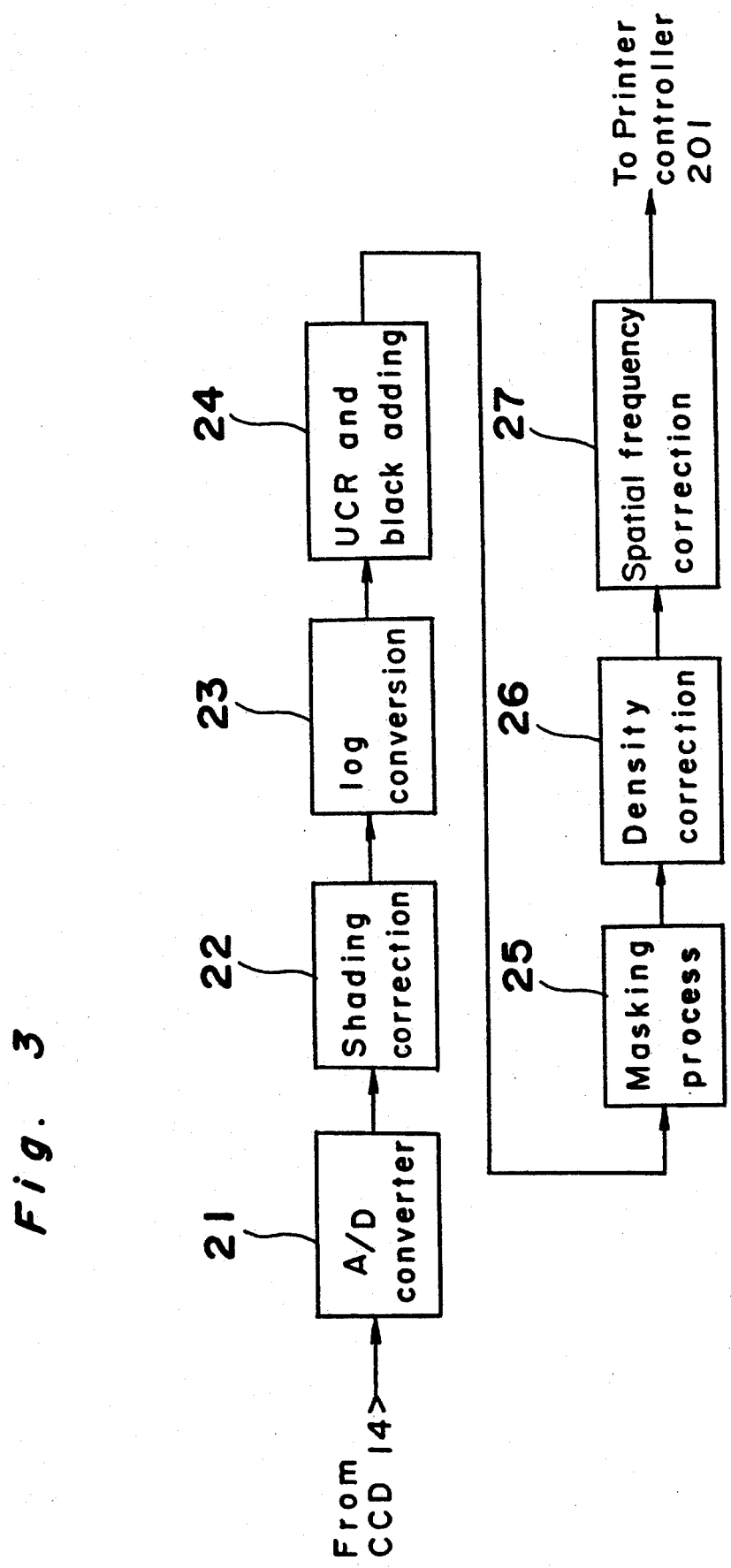

FIG. 3 shows a processing flow of the image signal transmitted from the CCD color image sensor 14 through the image signal processor 20 to the printer controller 201. A process for processing electric image signals and outputting gradation data will be described below with reference to FIG. 3.

In the image signal processor 20, analogue electric image signals which photoelectrically converted by the CCD color image sensor 14 are converted into multivalue digital image data of three colors R, G and B by an analogue to digital converter (referred to as an A/D converter hereinafter) 21. The converted digital image data of respective colors are inputted to a shading correction circuit 22, which performs a shading correction process for the inputted digital image data. Since the image data after completion of the shading correction process are data of the reflected light from the original, the image data thereof are outputted from the shading correction circuit 22 to a logarithmic conversion circuit 23, which performs a logarithmic conversion process for converting the inputted image data into density data of the actual original image. Thereafter, the density data are inputted to an under color removal and black adding circuit (referred to as a UCR and black adding circuit hereinafter) 24, which performs not only an under color removal process for removing unnecessary black components but also a black adding process for generating image data of black based on density data of three colors R, G and B. Further, a masking process circuit 25 converts the density data of three colors R, G and B outputted from the UCR and black adding circuit 24 into density data of three colors of yellow (Y), magenta (M) and cyan (C), and then, a density correction circuit 26 performs a density correction process for respectively multiplying the converted density data of three colors by predetermined coefficients. Thereafter, a spatial frequency correction circuit 27 performs a spatial frequency correction process for the density data after completion of the density correction process, and outputs the processed density data as eight bit image data to the printer controller 201.

FIG. 4 shows an image data processing part of the printer controller 201.

The eight bit image data outputted from the image signal processor 20 are inputted through an interface part 251 to a first in first out memory (referred to as an FIFO memory hereinafter) 252. The FIFO 252 is a line buffer memory for storing gradation data of images of a predetermined number of scan lines in a main scan direction perpendicular to the subscan direction, and is provided to absorb a difference between frequencies of operation clocks of the image reader part 100 and the copying part 200. Image data read out from the FIFO 252 are inputted to a $\gamma$ correction part 253. As described in detail later, the $\gamma$ correction data of the $\gamma$ correction table stored in the data ROM 203 are transferred from a laser exposure controller 220 of the printer controller 201 to the $\gamma$ correction part 253, and then, the $\gamma$ correction part 253 performs a $\gamma$ correction process for the inputted image data based on the transferred $\gamma$ correction data, and outputs digital image data of ten bits after completion of the $\gamma$ correction process to a digital to analogue converter (referred to as a D/A converter hereinafter) 254.

The D/A converter 254 converts the inputted digital image data to an analogue voltage and outputs it to the semiconductor laser diode 264 through an amplifier 255, a variable attenuator 266, the driving I/O 261 and the semiconductor laser driver 263, and then, the semiconductor laser diode 264 emits a beam of laser light with an emitting intensity corresponding to the digital image data. The attenuation amount of the variable attenuator 266 is changed in eight steps in accordance with a gain switching signal outputted from the laser exposure controller 220, thereby changing the power of a beam of laser light emitted from the semiconductor laser diode 264 in eight steps.

Further, clock generators 270a and 270b generate clock signals of clock frequencies different from each other to the semiconductor laser driver 263 through terminals a and b of a switch SW and the parallel I/O 262, respectively. The switch SW is switched over by a clock switching signal outputted from the laser exposure controller 220, and then, the two clock signals are selectively inputted through the parallel I/O 262 to the semiconductor laser driver 263.

Figure 8A:
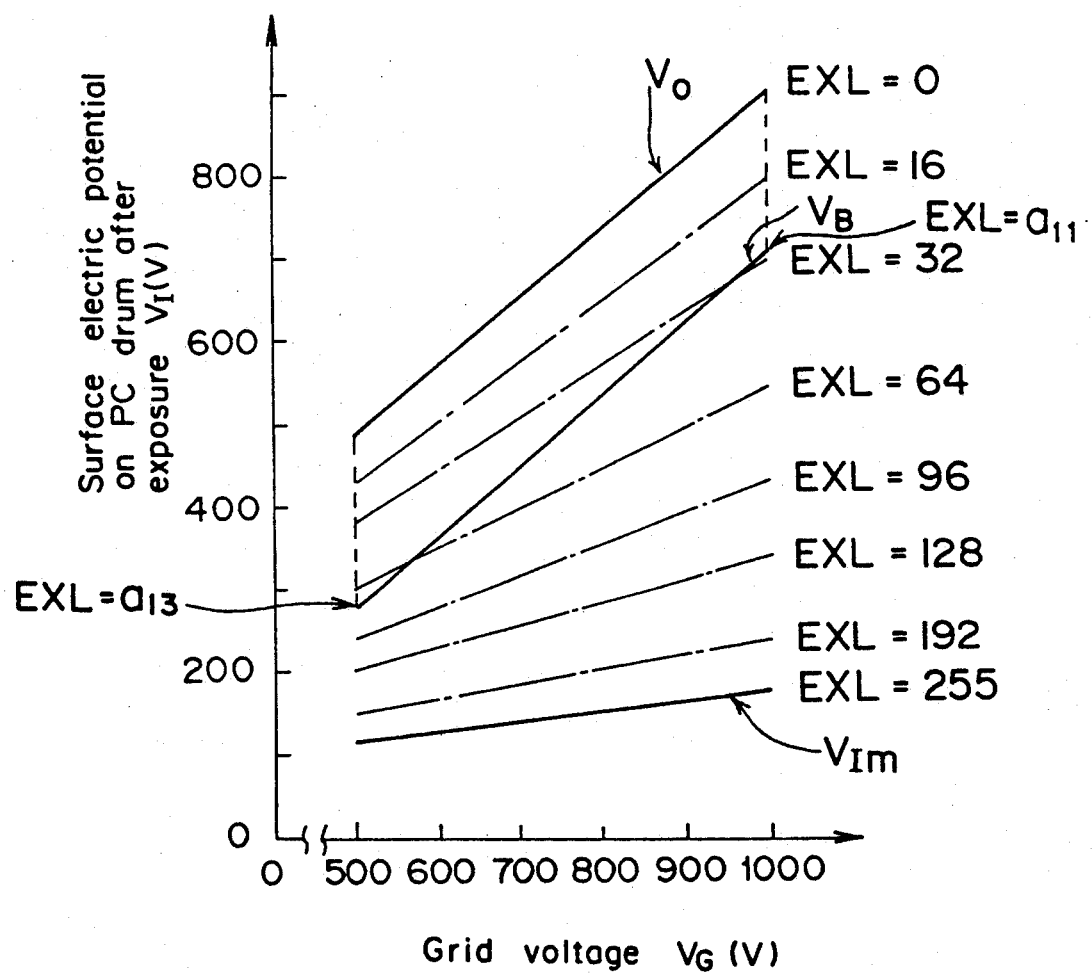
FIGS. 8a to 8c are graphs showing relationships between a grid voltage and a surface electric potential on the photoconductive drum after an exposure of a beam of laser light of the respective digital full color copying apparatuses.

(c) Automatic density control and Gradation correction in Electrophotographic process of reversal development type FIG. 8a is a graph showing characteristics of the surface electric potential $V_I$ on the photoconductive drum after an exposure of a beam of laser light and the developing bias voltage $V_B$ to the grid voltage $V_G$, of the conventional digital full color copying apparatus described in the above description of the related art, which controls the image reproduction density so that the difference between the surface potential $V_O$ on the photoconductive drum 41 and the developing bias voltage $V_B$ is made constant.

Referring to FIG. 8a, an area positioned between a straight line of the surface electric potential immediately prior to the exposure of a beam of laser light or the surface electric potential $V_O$ when the exposure level EXL is zero and a straight line of the developing bias voltage $V_B$ is a fog removal area capable of setting the grid voltage $V_G$ and the developing bias voltage $V_B$ so as to prevent any fog when the exposure level EXL is zero. Further, an area positioned between the straight line of the developing bias voltage $V_B$ and a straight line of the surface electric potential $V_{Im}$ when the exposure level EXL is 255 is a developing area capable of setting the grid voltage $V_G$ and the developing bias voltage $V_B$ so as to actually form an image on a sheet of copying paper upon printing.

Figure 7A:
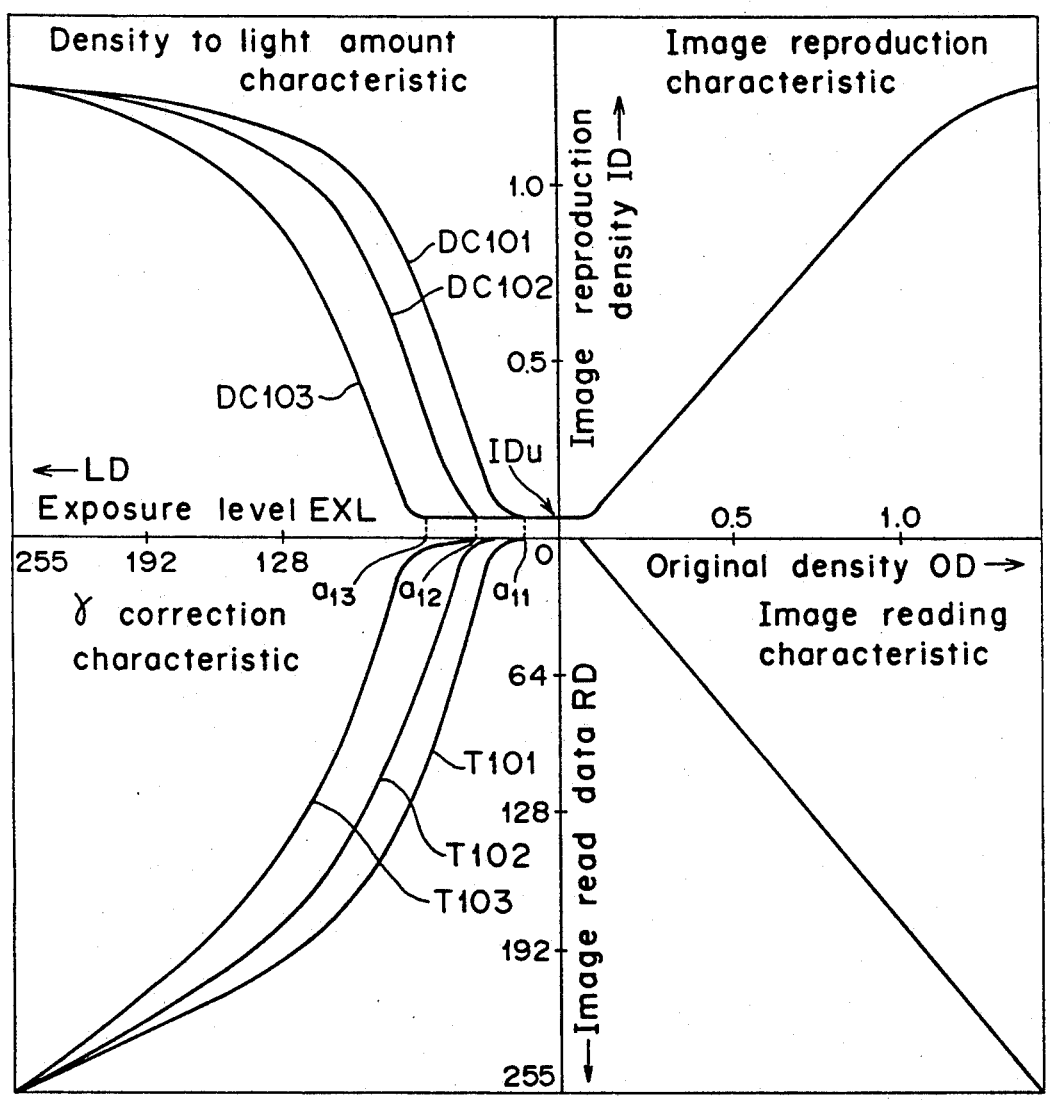
FIGS. 7a to 7c are graphs of sensitometries showing an image reproduction density to light amount characteristic, an image reproduction characteristic, an γ correction characteristic and an image read characteristic of respective digital full color copying apparatuses.

FIG. 7a is a graph of a sensitometry showing an image reproduction density to light amount characteristic, an image reproduction characteristic, an $\gamma$ correction characteristic and an image read characteristic of the conventional digital full color copying apparatus in which the developing bias voltage $V_B$ as shown in FIG. 8a.

Figure 7B:
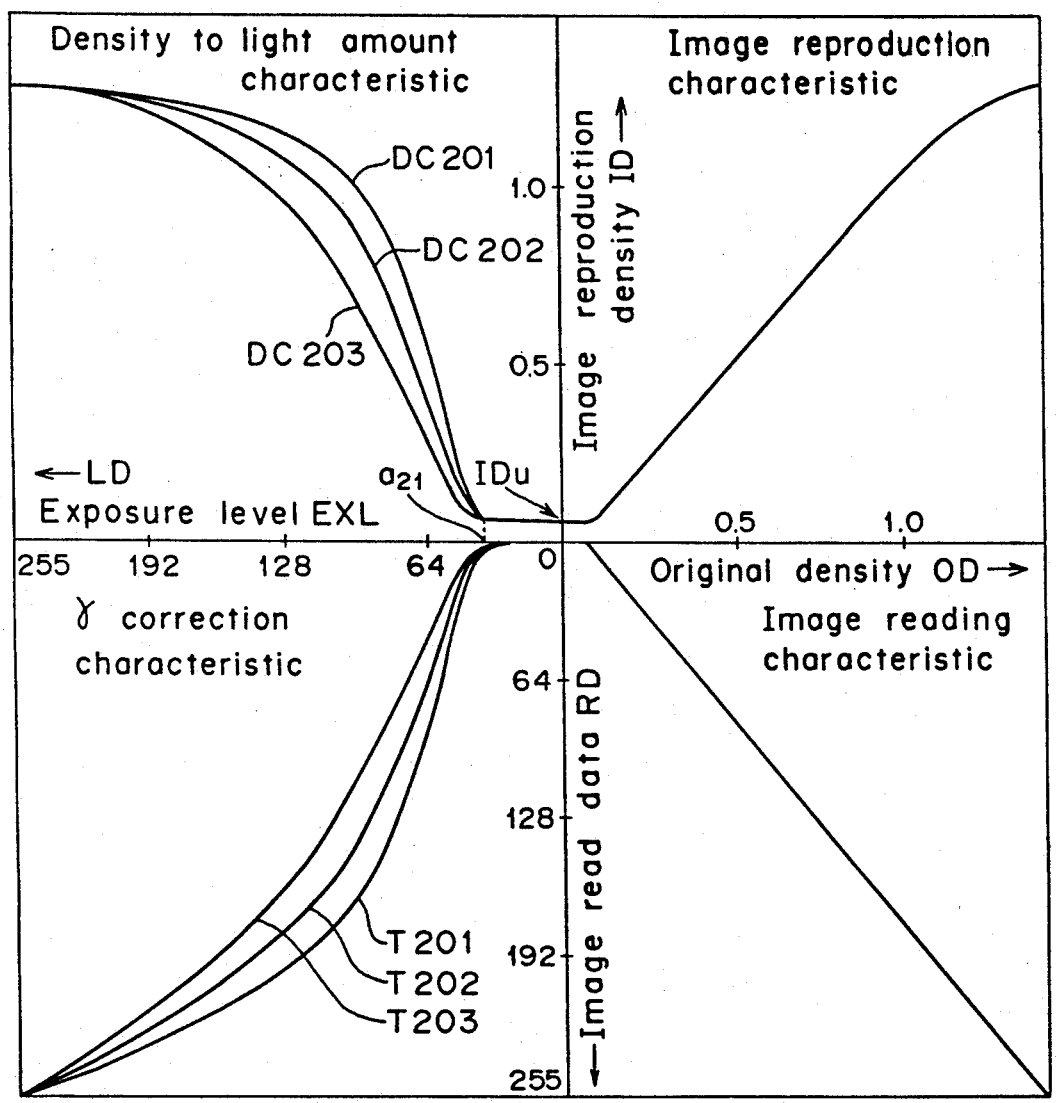
Figure 7C:
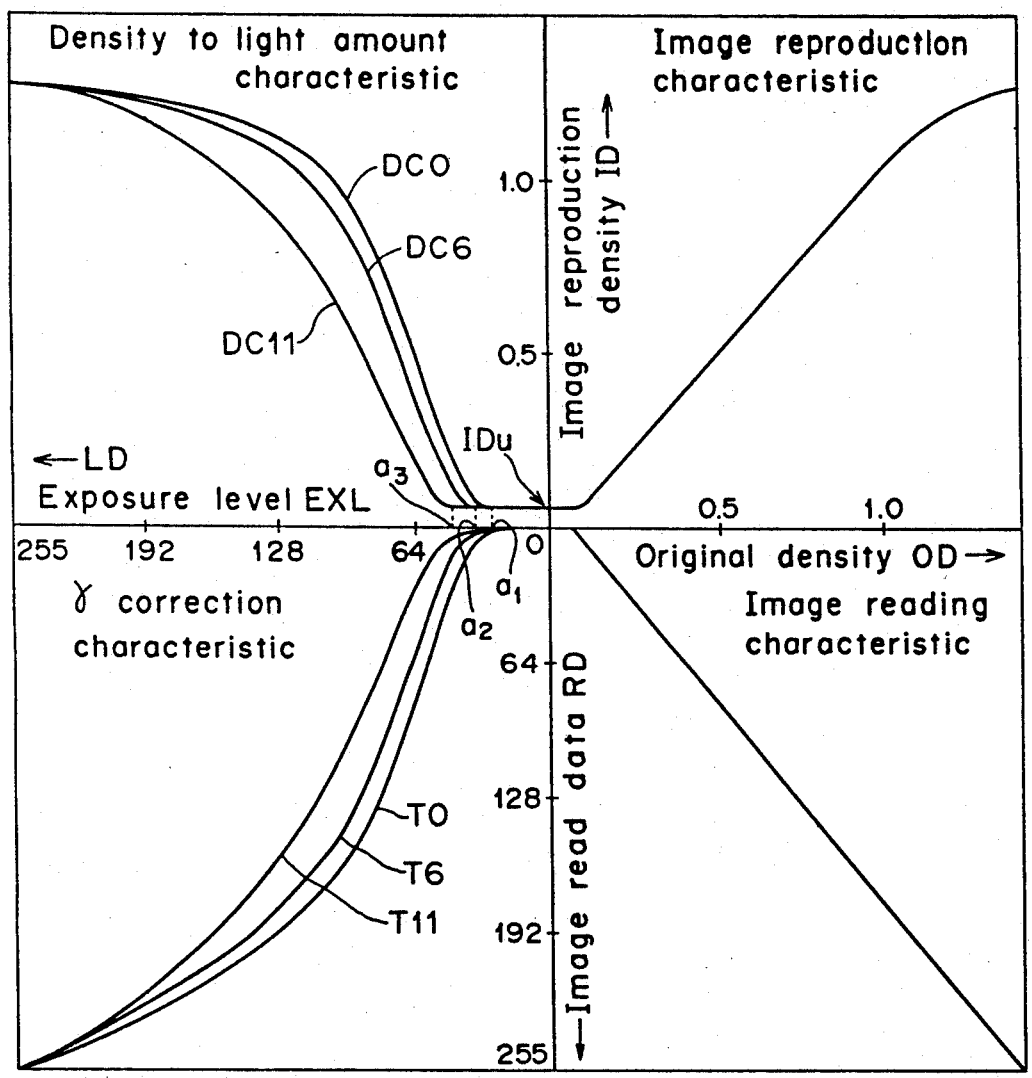

In FIGS. 7a to 7c, the image reproduction density ID is represented as an absolute density which is the sum of an image density of a printed image and a density of a background of a copying paper on which the image is to be printed, wherein a reflection density is zero in the case of a white plate of calcium carbonate. Therefore, even though an original density is zero, there can be measured an image density IDu of the background of the copying paper. Further, in the image reproduction density to light amount characteristic of FIG. 7a, a characteristic curve DC101 is that in applications of a grid voltage $V_G$ of 570 V and a developing bias voltage $V_B$ of 345 V, a characteristic curve DC102 is that in applications of a grid voltage $V_G$ of 700 V and a developing bias voltage $V_B$ of 450 V, and a characteristic curve DC103 is that in applications of a grid voltage $V_G$ of 900 V and a developing bias voltage $V_B$ of 620 V. In this case, $\gamma$ correction characteristics T101, T102 and T103 are be previously made in a manner similar to those skilled in the art so as to obtain a desirable image reproduction characteristic shown in the first quadrant of the sensitometry shown in FIG. 7a, based on the above image reproduction density to light amount characteristics DC101, DC102 and DC103, respectively.

In the conventional digital full color copying machine for controlling the image reproduction density so as to making a difference between the surface electric potential Vo on the photoconductive drum 41 and the developing bias voltage $V_B$ constant, the following is apparent from FIGS. 7a and 8a.

(1) When a combination of the grid voltage $V_G$ and the developing bias voltage $V_B$ is determined, there can be determined an exposure level EXL when the image reproduction density equal to the image reproduction density IDu, namely, a reproduction start light amount when an image is first reproduced as the exposure level EXL changes from zero toward a positive larger value.

(2) As the grid voltage $V_G$ and the developing bias voltage $V_B$ become larger, the above-mentioned reproduction start light amount becomes smaller, and also change in the reproduction start light amount becomes greatly larger.

(3) The $\gamma$ correction characteristic changes depending on change in the reproduction start light amount.

Namely, as is apparent from FIG. 8a, when the grid voltage $V_G$ is changed from 500 V to 1000 V, the reproduction start light amount changes from $a_{13}$=about 70 to $a_{11}$=about 30.

However, as described above, the reproduction start light amount changes by setting the selected grid voltage $V_G$ and the selected developing bias voltage $V_B$, and then, a number of reproducible gradations changes. In particular, there is caused such a problem that change in the quality of image in a relatively low density to which human eyes are very sensitive becomes larger.

In order to solve the above-mentioned problem, it is considered that combinations of the grid voltage $V_G$ and the developing bias voltage $V_B$ are set so that the reproduction start light amounts corresponding to the respective combinations are equal to each other. In order to set combinations of the grid voltage $V_G$ and the developing bias voltage $V_B$ so that the reproduction start light amounts corresponding to the respective combinations are equal to each other, it is necessary to set them so as to satisfy the following equation.

$$(V_B - V_{Im})/(V_O - V_{Im}) = \text{constant} \tag{1}$$

Figure 8B:
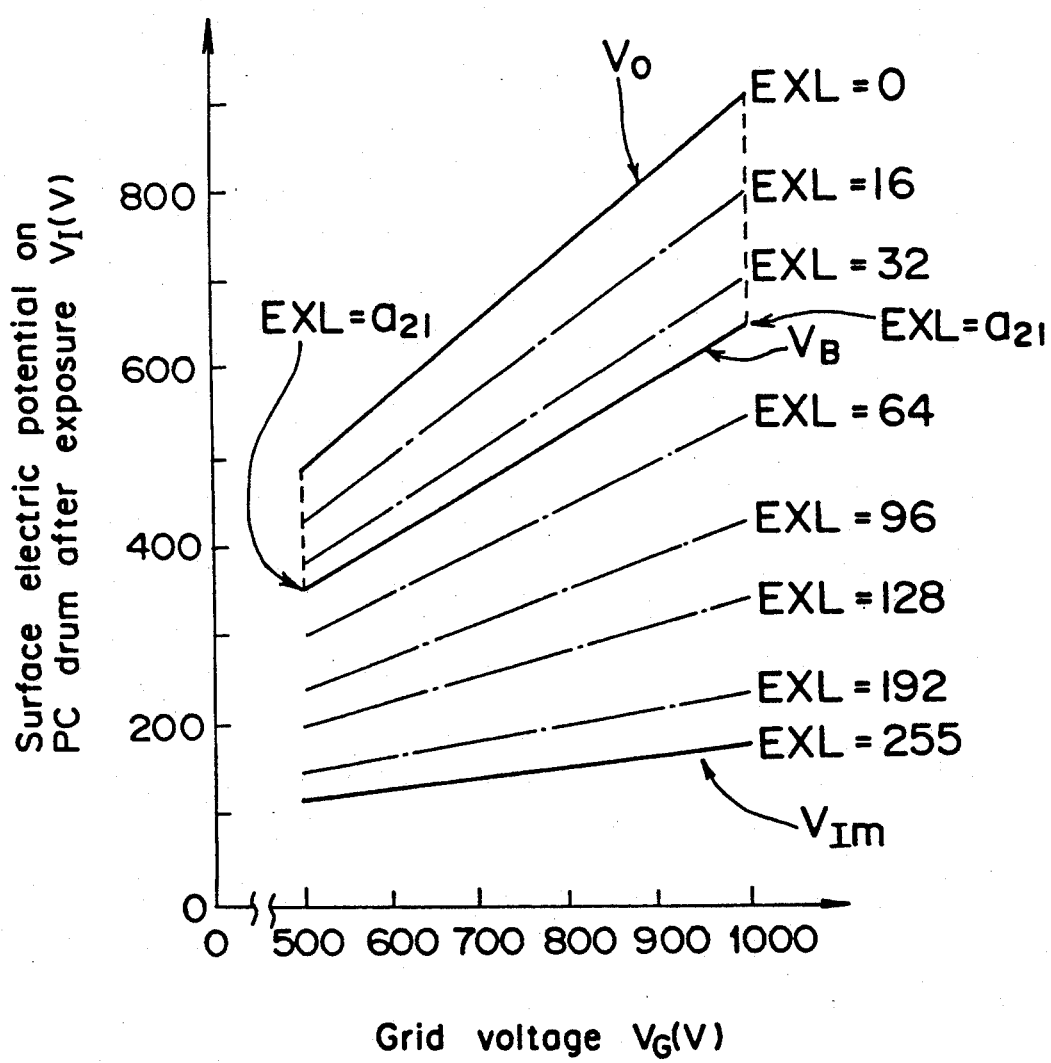

FIG. 8b is a graph showing characteristics of the surface electric potential $V_I$ on the photoconductive drum after an exposure of a beam of laser light and the developing bias voltage $V_B$ to the grid voltage $V_G$, of an improved digital full color copying apparatus for improving the gradation characteristics by setting the combinations of the grid voltage $V_G$ and the developing bias voltage $V_B$ so that the corresponding reproduction start light amounts are equal to each other, and FIG. 7b is a graph of a sensitometry showing an image reproduction density to light amount characteristic, an image reproduction characteristic, an $\gamma$ correction characteristic and an image read characteristic of the improved digital full color copying machine having the characteristics shown in FIG. 8b.

As is apparent from FIG. 8b, the developing bias voltages $V_B$ are set so that the corresponding reproduction start light amounts are equal to each other. In this case, $|V_o-V_B|$ is set to 270 V in an application of a grid voltage $V_G$ of 1000 V, and further, $|V_o-V_B|$ is set to 130 V in an application of a grid voltage $V_G$ of 500 V. Therefore, when the grid voltage $V_G$ is set to a relative high value such as 1000 V, the carrier included in the developer easily adheres onto the photoconductive drum 41. On the other hand, when the grid voltage $V_G$ is set to a relative low value such as 500 V, there is easily caused a fog on a background of a copying paper.

Further, as is apparent from FIG. 7b, change in the gradient of the image reproduction density to light amount characteristic in a relatively low density (See the characteristics curves DC201, DC202 and DC203) when changing the grid voltage $V_G$ becomes relatively large, namely, change in the gradient of the $\gamma$ correction characteristic in the relatively low density (See the characteristics T201, T202 and T203) becomes relatively large. In this case, similarly to that of FIG. 7a, a number of reproducible gradations changes, in particular, there is caused such a problem that change in the quality of image in the relatively low density to which human eyes are very sensitive becomes relatively larger, resulting in deterioration in the gradation characteristics.

In order to solve these problems, the present preferred embodiment according to the present invention is characterized in that, as the absolute value of the grid voltage $V_G$ or the surface electric potential Vo becomes higher, the developing bias voltage $V_B$ is set so that an absolute value $|V_o-V_B|$ of a difference between the surface electric potential Vo and the developing bias voltage $V_B$ becomes larger and also the reproduction start light amount becomes smaller.

It is to be noted that, in stead of setting the developing bias voltage $V_B$ so that the reproduction start light amount becomes smaller as the grid voltage $V_G$ becomes higher as described above, the developing bias voltage $V_B$ may be set so that the value of the ratio $(V_B-V_{Im})/(V_o-V_{Im})$ becomes larger as the absolute value of the surface electric potential Vo becomes higher.

Figure 8C:
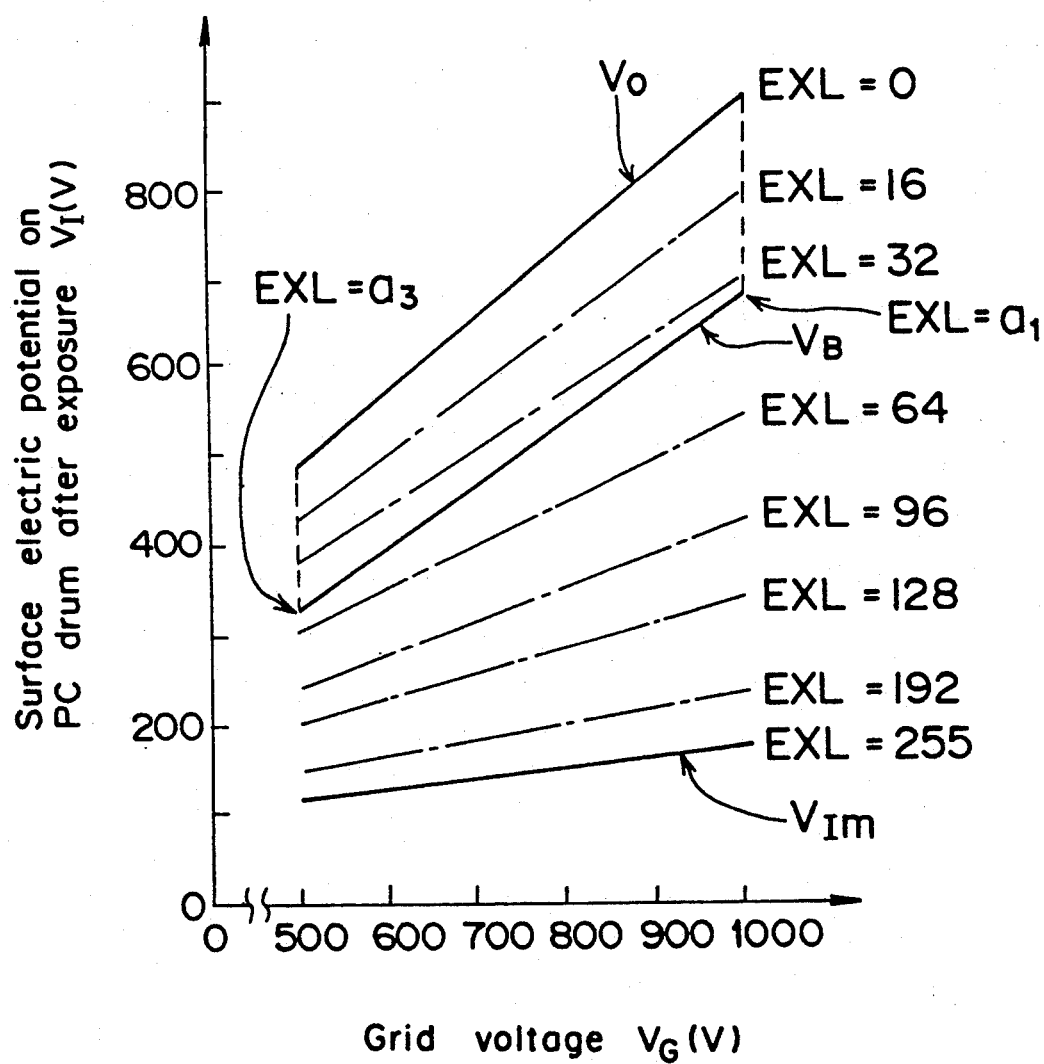

FIG. 8c is a graph showing characteristics of the surface electric potential $V_I$ on the photoconductive drum after an exposure of a beam of laser light and the developing bias voltage $V_B$ to the grid voltage $V_G$, of the further improved digital full color copying apparatus of the present preferred embodiment, and FIG. 7c is a graph of a sensitometry showing an image reproduction density to light amount characteristic, an image reproduction characteristic, an $\gamma$ correction characteristic and an image read characteristic of the digital full color copying machine of the present preferred embodiment.

As is apparent from FIG. 8c, a characteristic of a straight line of the developing bias voltage $V_B$ of the present preferred embodiment can be obtained by slightly rotating the characteristic of the straight line of the developing bias voltage $V_B$ shown in FIG. 8b which is set so that the corresponding reproduction start light amounts become equal to each other, around a characteristic point thereof in an application of a grid voltage $V_G$ of about 750 V, in the counterclockwise direction when seen from the upper side of FIG. 8c. In this case, when the grid voltage $V_G$ is changed from 500 V to 1000 V, the absolute value $|V_o-V_B|$ is set so as to fall in a range from 170 V to 230 V.

According to experiments performed by the present inventors, when the absolute value $|V_o-V_B|$ is set so as to fall in a range from 150 V to 250 V as the grid voltage $V_G$ is changed from 500 V to 1000 V, any carrier included in the developer does not adhere onto the photoconductive drum 41, and also any fog can be removed in the present preferred embodiment.

Further, as shown in FIG. 7c, when the grid voltage $V_G$ is changed, the reproduction start light amount slightly changes in an order of $a_1$, $a_2$ and $a_3$. However, change in the gradient of the reproduction image density to light amount characteristic in the relatively low density (See characteristics curves DC0, DC6 and DC11) when changing the grid voltage $V_G$ or change in the gradient of the $\gamma$ correction characteristic in the relatively low density (See characteristics curves T0, T6 and T11) is relatively small. Therefore, there can be improved gradation characteristics as compared with those of the conventional apparatus, and there can be obtained a stable image reproduction characteristic.

In the electrophotographic process of reversal development type of the present preferred embodiment, the image reproduction density is automatically controlled in accordance with the grid voltage $V_G$ and the developing bias voltage $V_B$, in a manner similar to that of the conventional apparatus.

On the other hand, the adhering toner amount onto the photoconductive drum 41 upon a predetermined exposure level is detected by the AIDC sensor 210. In the present preferred embodiment, a condition of a grid voltage $V_G$ of 600 V, a developing bias voltage $V_B$ of 400 V and an exposure level EXL of 120 is referred to as a reference toner image forming condition hereinafter. In this case, the surface electric potential $V_I$ after the exposure of a beam of laser light is set to 300 V, and then, the developing voltage $\Delta V = |V_B-V_I|$ becomes 100 V. Under the above-mentioned reference toner image forming condition, a reference toner image which become a reference for the image density control process on the photoconductive drum 41 is formed, and then, a regular reflected light and a scattering reflected light from the reference toner image are detected by the AIDC sensor 210 provided in the vicinity of the photoconductive drum 41. Respective detection signals of the regular reflected light and the scattering reflected light are inputted from the AIDC sensor 210 to the printer controller 201, and then, the printer controller 201 calculates an adhering toner amount based on a difference between the inputted respective detection signals. The automatic image density control process for making the adhering toner amount at the maximum image reproduction density level constant is performed by changing the surface electric potential Vo on the photoconductive drum 41 or a combination of the grid voltage $V_G$ and the developing bias voltage $V_B$ based on the calculated adhering toner amount. For example, when the electric charge amount of toner changes due to change in circumstances such as the relative humidity and then the developing efficiency changes, the maximum image reproduction density can be automatically kept constant by the changing the grid voltage $V_G$ and the developing bias voltage $V_B$.

In the present preferred embodiment, set values of the developing bias voltage $V_B$ and the grid voltage $V_G$ are changed depending on a density detection level LBA corresponding to the detection value detected by the AIDC sensor 210 so that each developing bias voltage $V_G$ corresponds to each grid voltage $V_G$.

Tables 1 to 3 shows examples of data of combinations of the developing bias voltage $V_B$ and the grid voltage $V_G$. In the present preferred embodiment, the developing bias voltage $V_B$ and the grid voltage $V_G$ are respectively negative values, however, they are expressed in a form of absolute values in Table 2.

In Tables 1 to 3, the detected adhering toner amount is an adhering toner amount which is measured by the AIDC sensor 210 with respect to the reference toner image formed under the above-mentioned reference toner image forming condition, and the developing efficiency is defined using the adhering toner amount by the following equation:

Developing efficiency = (Adhering toner amount)/(Developing voltage $\Delta V$)     (2).

In this case, a developing voltage $\Delta Vd$ (referred to as a setting developing voltage hereinafter) required for obtaining a desirable adhering toner amount is defined by the following equation:

Setting developing voltage $\Delta Vd$ = (Desirable adhering toner amount)/ (Developing efficiency)     (3).

In the present preferred embodiment, the desirable adhering toner amount is 1 mg/cm$^2$, and there is shown in Table 1 the setting developing voltage $\Delta Vd$ at that time.

The detection values of the AIDC sensor 210 correspond to the density detection levels LBA in a range from zero to 11 as shown in Tables 1 to 3. Depending on the respective density detection levels LBA, the developing bias voltage $V_B$ is changed from 280 V to 710 V, and also the grid voltage $V_G$ is changed from 470 V to 1030 V. Further, as shown in FIG. 7c, $\gamma$ correction tables T0 to T11 are set depending on the combination of the grid voltage $V_G$ and the developing bias voltage $V_B$ based on the desirable image reproduction characteristic in a manner similar to that of conventional apparatus. Namely, for example, as shown in the second quadrant of FIG. 7c, in the case of an image reproduction density to light amount characteristic DC6, the $\gamma$ correction process is performed using the $\gamma$ correction table T6, thereby obtaining an image reproduction characteristic shown in the first quadrant of FIG. 7c.

(d) Control flow of printing process

Figure 6:
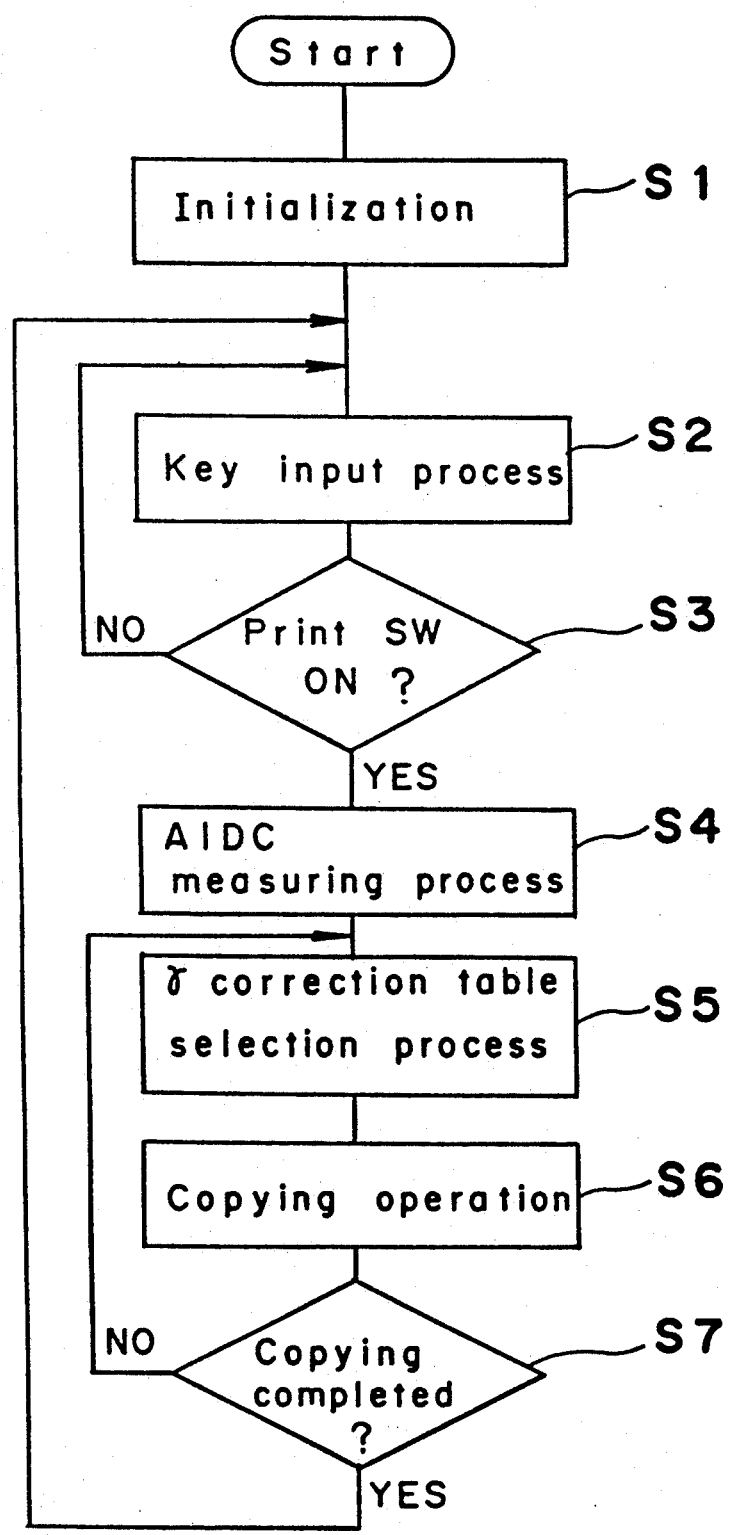
FIG. 6 is a flow chart of a control flow executed by the printer controller shown in FIG. 2b.

The control flow of printing process in the printer controller 201 will be described with reference to a flow chart shown in FIG. 6.

In the first place, after the printer controller 201 is initialized thereinside in step S1, there is performed an input process using the operation panel 221 in step S2. Thereafter, it is detected in step S3 whether or not a print switch (not shown) of the operation panel 221 is turned on. When the print switch is not turned on (NO in step S3), the program flow goes back to step S2, and then, the printer controller 201 becomes a waiting state until the print switch is turned on.

On the other hand, when the print switch is turned on (YES in step S3), an AIDC process is carried out in step S4. In the AIDC process, the grid voltage $V_G$ and the developing bias voltage $V_B$ are set to respective predetermined standard values, and then, a predetermined detection image pattern is formed on the photoconductive drum 41. Thereafter, the predetermined detection image pattern is developed using toner so as to form the reference toner image thereon. An image reproduction density corresponding to an adhering toner amount of the reference toner image is measured by the AIDC sensor 211, and then, data thereof are stored in a RAM provided in the printer controller 201.

In step S5, there is performed a $\gamma$ correction table selection process for selecting a $\gamma$ correction table among the plural $\gamma$ correction tables, namely, a grid voltage $V_G$, a developing bias voltage $V_B$, and a $\gamma$ correction table (one of the 12 $\gamma$ correction tables T0 to T11 ) are selected from Tables 1 to 3 on the basis of the density detection level LBA corresponding to the adhering toner amount detected in the AIDC process. Thereafter, the copying process known to those skilled in the art is performed in step S6 based on the selected grid voltage $V_G$, the selected developing bias voltage $V_B$, and the selected $\gamma$ correction table.

Thereafter, it is checked in step S7 whether or not the copying process is completed. If the copying process is completed (YES in step S7), the program flow returns to step S2. On the other hand, if the copying process is not completed (NO in step S7), the program flow returns to step S5.

As described above, according to the present preferred embodiment, change in the $\gamma$ characteristic caused due to a result of the density control process is corrected so as to always obtain a reproduced image having a stable constant gradation reproducibility for an original using an improved gradation characteristic as compared with that of the conventional apparatus. Further, there can be prevented not only the carrier from adhering onto the photoconductive drum 41 which may be caused in the case of a relatively high grid voltage $V_G$ but also any fog which may be caused in the case of a relatively low grid voltage $V_G$.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

TABLE 1

| Density detection level LBA | Detected adhering toner amount [mg/cm$^2$] | Developing efficiency | Setting developing voltage $\Delta Vd$ [V] |
|---|---|---|---|
| 0 | 0.625 | 0.00625 | 160 |
| 1 | 0.510 | 0.00510 | 195 |
| 2 | 0.455 | 0.00455 | 220 |
| 3 | 0.410 | 0.00410 | 245 |
| 4 | 0.385 | 0.00385 | 260 |
| 5 | 0.345 | 0.00345 | 290 |
| 6 | 0.310 | 0.00310 | 320 |
| 7 | 0.280 | 0.00280 | 355 |
| 8 | 0.260 | 0.00260 | 385 |
| 9 | 0.240 | 0.00240 | 420 |
| 10 | 0.210 | 0.00210 | 480 |
| 11 | 0.180 | 0.00180 | 560 |

TABLE 2

| Density detection level LBA | Grid voltage $V_G$ [V] | Surface electric potential $V_o$ [V] | Developing bias voltage $V_B$ [V] |
|---|---|---|---|
| 0 | 470 | 450 | 280 |
| 1 | 510 | 490 | 315 |
| 2 | 545 | 525 | 345 |
| 3 | 580 | 555 | 370 |
| 4 | 610 | 580 | 390 |
| 5 | 655 | 615 | 420 |

TABLE 2-continued

| Density detection level LBA | Grid voltage $V_G$ [V] | Surface electric potential $V_o$ [V] | Developing bias voltage $V_B$ [V] |
|---|---|---|---|
| 6 | 700 | 650 | 450 |
| 7 | 740 | 695 | 490 |
| 8 | 790 | 730 | 520 |
| 9 | 850 | 775 | 560 |
| 10 | 930 | 845 | 625 |
| 11 | 1030 | 940 | 710 |

TABLE 3

| Density detection level LBA | $V_o - V_B$ [V] | $V_{Im}$ [V] | γ correction table |
|---|---|---|---|
| 0 | 170 | 120 | T0 |
| 1 | 175 | 120 | T1 |
| 2 | 180 | 125 | T2 |
| 3 | 185 | 125 | T3 |
| 4 | 190 | 130 | T4 |
| 5 | 195 | 130 | T5 |
| 6 | 200 | 130 | T6 |
| 7 | 205 | 135 | T7 |
| 8 | 210 | 135 | T8 |
| 9 | 215 | 140 | T9 |
| 10 | 220 | 145 | T10 |
| 11 | 230 | 150 | T11 |

What is claimed is:

1. An electrophotographic image forming apparatus comprising:
   a photoconductor;
   charger means for electrically charging said photoconductor to a predetermined initial electric potential so as to supply an amount of electric charge corresponding to the predetermined initial electric potential thereto;
   light projecting means for projecting a light onto said photoconductor electrically charged to the predetermined initial electric potential so as to form an electrostatic latent image on said photoconductor;
   light projecting control means for controlling said light projecting means to change a light amount of the light projected onto said photoconductor by said light projecting means according to an image density signal for representing densities of respective pixels of an image to be formed;
   developing means for developing the electrostatic latent image formed on said photoconductor with toner so as to form a toner image on said photoconductor;
   voltage applying means for applying a developing bias voltage to said developing means; and
   density control means for controlling said charger means and said voltage applying means to change the amount of electric charge supplied from said charger means to said photoconductor and the developing bias voltage, said density control means controlling said voltage applying means so that a difference between the predetermined initial electric potential and the developing bias voltage becomes larger and a light amount of first starting reproducing an image which is a minimum light amount from said light projecting means when the toner image is formed on said photoconductor becomes smaller as the amount of electric potential supplied to said photoconductor becomes larger.

2. The apparatus as claimed in claim 1,
wherein said light projecting control means controls said light projecting means to change an area of a portion on said photoconductor projected corresponding to each pixel according to the image density signal.

3. The apparatus as claimed in claim 1,
wherein said light projecting control means controls said light projecting means to change an intensity of the light projected onto said photoconductor according to the image density signal.

4. The apparatus as claimed in claim 1, further comprising detection means for detecting a state of a surface of said photoconductor;
wherein said density control means controls said charger means and said voltage applying means to change the amount of electric charge and the developing bias voltage according to a detection result of said detection means.

5. The apparatus as claimed in claim 4,
wherein said detection means detects an image density of the toner image formed on said photoconductor.

6. The apparatus as claimed in claim 1,
wherein said charger means comprises an electrically charging electrode for supplying an electric charge to said photoconductor, and a grid electrode provided between said charging electrode and said photoconductor, said grid electrode regulating the amount of electric charge supplied from said charging electrode to said photoconductor, and
said density control means controls said charger means to change an electric potential of said grid electrode.

7. An electrophotographic image forming apparatus comprising:
   a photoconductor;
   charger means for electrically charging said photoconductor to a predetermined initial electric potential;
   light projecting means for projecting a light onto said photoconductor electrically charged to the predetermined initial electric potential so as to form an electrostatic latent image on said photoconductor;
   developing means for developing the electrostatic latent image formed on said photoconductor with toner so as to form a toner image on said photoconductor;
   voltage applying means for applying a developing bias voltage to said developing means; and
   density control means for controlling said charger means and said voltage applying means to change the initial electric potential and the developing bias voltage, said density control means controlling said charger means and said voltage applying means so that a difference between the initial electric potential and the developing bias voltage becomes larger and a value of the following ratio becomes larger as the absolute value of the initial electric potential becomes larger:

$$(V_B \cdot V_{Im})/(V_o - V_{Im}),$$

where $V_B$ is the developing bias voltage,
$V_o$ is the initial electric potential, and
$V_{Im}$ is an electric potential on the surface of said photoconductor in the case of a maximum light amount of the light projected from said light projecting means onto said photoconductor.

8. The apparatus as claimed in claim 7,
wherein said charger means comprises an electrically charging electrode for supplying an electric charge to said photoconductor; and a grid electrode provided between said charging electrode and said photoconductor, said grid electrode regulating the amount of electric charge supplied from said charging electrode to said photoconductor, and
said density control means controls said charger means to change an electric potential of said grid electrode.

9. The apparatus as claimed in claim 7, further comprising detection means for detecting a state of a surface of said photoconductor,
wherein said density control means controls said charger means and said voltage applying means to change the amount of electric charge and the developing bias voltage according to a detection result of said detection means.

10. The apparatus as claimed in claim 7, further comprising toner image forming means for forming a toner image on said photoconductor,
wherein said detection means detects an image density of the toner image formed on said photoconductor by said toner image forming means.

11. An electrophotographic image forming apparatus comprising:
a photoconductor;
charger means for electrically charging said photoconductor to a predetermined initial electric potential;
light projecting means for projecting a light onto said photoconductor electrically charged to the predetermined initial electric potential so as to form an electrostatic latent image on said photoconductor;
developing means for developing the electrostatic latent image formed on said photoconductor with toner so as to form a toner image on said photoconductor;
voltage applying means for applying a developing bias voltage to said developing means;
detection means for detecting a state of said photoconductor;
storage means for storing a plurality of gradation correction data for correcting a gradation of an image to be formed;
selecting means for selecting one of the plurality of gradation correction data stored by said storage means based on the developing bias voltage and the initial electric potential;
correcting means for correcting an image density signal for representing densities of respective pixels of the image to be formed based on the gradation correction data selected by said selecting means;
light projecting control means for controlling a light amount of the light projected from said light projecting means onto said photoconductor according to the image density signal corrected by said correcting means; and
density control means for controlling said charger means and said voltage applying means to change the initial electric potential and the developing bias voltage based on a detection result of said detection means, said density control means controlling said charger means and said voltage applying means so that a difference between the initial electric potential and the developing bias voltage becomes larger and a value of the following ratio becomes larger as the absolute value of the initial electric potential becomes larger:

$$(V_B - V_{Im})/(V_o - V_{Im}),$$

where $V_B$ is the developing bias voltage,
$V_o$ is the initial electric potential, and
$V_{Im}$ is an electric potential on the surface of said photoconductor in the case of a maximum light amount of the light projected from said light projecting means onto said photoconductor.

12. The apparatus as claimed in claim 11,
wherein said light projecting control means controls said light projecting means to change an area of a portion on said photoconductor projected corresponding to each pixel according to the image density signal.

13. The apparatus as claimed in claim 11,
wherein said light projecting control means controls said light projecting means to change an intensity of the light projected onto said photoconductor according to the image density signal.

14. The apparatus as claimed in claim 11,
wherein said detection means detects an image density of the toner image formed on said photoconductor.

15. The apparatus as claimed in claim 11,
wherein said charger means comprises an electrically charging electrode for supplying an electric charge to said photoconductor; and a grid electrode provided between said charging electrode and said photoconductor, said grid electrode regulating the amount of electric charge supplied from said charging electrode to said photoconductor, and
said density control means controls said charger means to change an electric potential of said grid electrode.

16. The apparatus as claimed in claim 15, further comprising further storage means for storing a plurality of combinations of the developing bias voltage and the electric potential of the grid electrode,
wherein said density control means selects one of the plurality of combinations stored by said further storage means based on the detection result of said detection means.

* * * * *

UNITED STATES PATENT AND TRADEMARK OFFICE
CERTIFICATE OF CORRECTION

PATENT NO. : 5,212,560

DATED : May 18, 1993

INVENTOR(S) : Yoshihiro HATTORI et al

It is certified that error appears in the above-identified patent and that said Letters Patent is hereby corrected as shown below:

TITLE PAGE:

In Section [75], delete "Tokokawa" and insert -- Toyokawa --.

Signed and Sealed this

Fourth Day of January, 1994

Attest:

BRUCE LEHMAN

Attesting Officer

Commissioner of Patents and Trademarks